_(12)_ United States Patent
Wang et al.

(10) Patent No.: US 10,562,677 B2
(45) Date of Patent: Feb. 18, 2020

(54) HOLOGRAPHIC LAMINATE

(71) Applicant: Colgate-Palmolive Company, New York, NY (US)

(72) Inventors: Jun Wang, Fort Washington, PA (US); BoXian Li, GuangZhou (CN); Guoxing Zhang, Guangzhou (CN)

(73) Assignee: Colgate-Palmolive Company, New York, NY (US)

( * ) Notice: Subject to any disclaimer, the term of this patent is extended or adjusted under 35 U.S.C. 154(b) by 77 days.

(21) Appl. No.: 15/781,627

(22) PCT Filed: Dec. 15, 2015

(86) PCT No.: PCT/CN2015/097401
§ 371 (c)(1),
(2) Date: Jun. 5, 2018

(87) PCT Pub. No.: WO2017/101009
PCT Pub. Date: Jun. 22, 2017

(65) Prior Publication Data
US 2019/0337680 A1 Nov. 7, 2019

(51) Int. Cl.
*B65D 35/10* (2006.01)
*B32B 7/12* (2006.01)
(Continued)

(52) U.S. Cl.
CPC ............ *B65D 35/10* (2013.01); *B32B 1/08* (2013.01); *B32B 7/06* (2013.01); *B32B 7/12* (2013.01);
(Continued)

(58) Field of Classification Search
CPC ........ B65D 35/10; B65D 35/44; B65D 65/40; B32B 7/12; B32B 27/08; B32B 27/32;
(Continued)

(56) References Cited

U.S. PATENT DOCUMENTS 5,643,678 A 7/1997 Boswell
5,851,615 A 12/1998 Kay
(Continued)

FOREIGN PATENT DOCUMENTS

AU 642030 1/1992
CN 1520355 A 8/2004
(Continued)

OTHER PUBLICATIONS

Avery Dennison, 2014, "Holographic Kaleidoscope Film," Label and Packaging Materials, https://label.averydennison.com/en/home/resource-center/deeper-into-packaging/featured-materials/holographic-kaleidoscope-film.html, accessed Oct. 7, 2014, pp. 1-2.
(Continued)

*Primary Examiner* — Michael C Miggins (57) ABSTRACT

A laminate and a method for forming the laminate. The formation of the laminate may include attaching an inner polyolefin layer (104) and an outer polyolefin layer (106) to a barrier layer (102), wherein the barrier layer (102) is interposed between the outer and inner polyolefin layers. The formation of the laminate may further include forming a holographic film including a backing layer, a release layer (204), an adhesive layer (206), a holographic grating layer (208), a reflective layer (210), and a protective coating (212). The holographic film may be attached to the outer polyolefin layer (106) using a transfer adhesive (300). Subsequently, the backing layer may be removed from the release layer (204), then the release layer (204) may be primed, for example, by forming a primer overcoat layer on the release layer (204). A patterned layer (700), for example, text and/or graphics, may be formed on the primer layer (600), then a varnish layer (702) may be formed on the patterned layer (700).

18 Claims, 5 Drawing Sheets

(51) Int. Cl.
  *B32B 27/08* (2006.01)
  *B32B 27/32* (2006.01)
  *B32B 15/085* (2006.01)
  *B32B 15/20* (2006.01)
  *B32B 27/30* (2006.01)
  *B32B 27/36* (2006.01)
  *B32B 1/08* (2006.01)
  *B65D 35/44* (2006.01)
  *B65D 65/40* (2006.01)
  *B32B 7/06* (2019.01)

(52) U.S. Cl.
  CPC ............ *B32B 15/085* (2013.01); *B32B 15/20* (2013.01); *B32B 27/08* (2013.01); *B32B 27/306* (2013.01); *B32B 27/32* (2013.01); *B32B 27/36* (2013.01); *B65D 35/44* (2013.01); *B65D 65/40* (2013.01); *B32B 2250/05* (2013.01); *B32B 2255/10* (2013.01); *B32B 2255/26* (2013.01); *B32B 2307/40* (2013.01); *B32B 2307/7242* (2013.01); *B32B 2307/7265* (2013.01); *B32B 2439/00* (2013.01)

(58) Field of Classification Search
  CPC ..... B32B 15/085; B32B 15/20; B32B 27/306; B32B 27/36; B32B 1/08; B32B 7/06; B32B 2439/00; B32B 2307/7242; B32B 2307/40; B32B 2307/7265; B32B 2250/05; B32B 2255/10; B32B 2255/26
  See application file for complete search history.

(56) References Cited

U.S. PATENT DOCUMENTS

| | | |
|---|---|---|
| 6,210,766 B1 | 4/2001 | McLaughlin |
| 6,489,266 B1 | 12/2002 | Kurokawa et al. |
| 6,916,516 B1 | 7/2005 | Gerber et al. |
| 7,090,935 B2 | 8/2006 | Azakami et al. |
| 8,526,084 B2 | 9/2013 | Weyermann et al. |
| 8,865,374 B2 | 10/2014 | Sarnataro |
| 9,597,825 B2 | 3/2017 | Schmidt et al. |
| 2004/0009345 A1 | 1/2004 | Hummel |
| 2004/0091658 A1 | 5/2004 | Ginkell et al. |
| 2009/0155509 A1 | 6/2009 | Gupta et al. |
| 2013/0266751 A1 | 10/2013 | Schneider et al. |
| 2016/0272389 A1 | 9/2016 | Wang |
| 2017/0080669 A1 | 3/2017 | Jammet et al. |

FOREIGN PATENT DOCUMENTS

| | | |
|---|---|---|
| CN | 101755242 A | 6/2010 |
| CN | 102821937 A | 12/2012 |
| CN | 202656635 U | 1/2013 |
| CN | 102470581 | 7/2014 |
| CN | 106103073 | 11/2016 |
| FR | 2757102 | 6/1998 |
| GB | 2467696 A | 8/2010 |
| JP | H09-237030 | 9/1997 |
| JP | 2006-282184 A | 10/2006 |
| WO | 2015/181350 | 12/2015 |

OTHER PUBLICATIONS

BREIT Technologies, 2010, "Cast and Cure," http://www.breit-tech.com, accessed Oct. 7, 2014, pp. 1-2.

International Search Report and Written Opinion of the International Searching Authority in International Application No. PCT/CN2015/097401, dated Sep. 7, 2016.

Shantou Jinxintong Packing Material Co., Ltd., 1999, "Hologram Lamination Film for Toothpaste Box Packing," http://www.alibaba.com/product-detail/Hologram-Lamination-Film-for-Toothpaste-Box_60031606142.html, accessed Oct. 7, 2014, pp. 1-5.

U & Star Industry Co., Ltd, 2014, "Hot Sale Transparent PET Holographic Film for Lamination and Printing," http://www.ustar-beauty.com/sell-hot_sale_transparent_pet_holographic_film_for_lamination_and_printing-1095691.html, accessed Oct. 7, 2014, pp. 1-3.

HOLOGRAPHIC LAMINATE

BACKGROUND

Exterior packaging of consumer items is important in attracting the attention of a potential consumer such that the consumer will consider purchasing the product. Low-quality exterior packaging often suggests that the product itself is of poor quality. Conversely, exterior packaging that is attractive and appears to be of high quality will often convey to the potential consumer that the product within is also of high quality.

In addition to exterior packaging such as a box or carton, some products such as toothpaste, various food items, lotions, etc., include internal packaging within the exterior packaging. The interior packaging may be in the form of a flexible tube that stores the product until use. Some items may use the tube itself as the exterior packaging. In either case, the look and feel of the tube is important in either attracting a potential customer to consider the item for purchase, or in retaining the customer for subsequent sales and word-of-mouth advertising.

Holograms have been used for product packaging due, for example, to their attractive and high-quality appearance. Holograms have been limited to cellulosic materials (e.g., cardboard, paper, etc.) as other non-cellulosic materials are chemically inert and do not lend themselves to the surface formation of a hologram.

Formation of a sharp hologram requires at least two structures, including an embossed surface to generate light interference and a reflective surface to magnify the holographic effect. The formation of a holographic film can include depositing a metal onto a plastic film and then embossing the metallized film with a suitable grating pattern. Other methods of hologram manufacture include the formation of the reflective surface and the embossed surface on the same film surface, for example, by embossing a grating pattern onto a film surface and then depositing a thin aluminum coating to create the reflective surface.

Relocating decorative package and product information from an exterior carton to a product tube, such as a plastic tube, would provide the potential to omit the exterior packaging altogether while still displaying an attractive hologram to a potential consumer prior to product purchase. Reducing the amount of packaging (e.g., omitting the exterior packaging) reduces costs and packaging waste. As such, structures that include a hologram on the exterior of a plastic package and their methods of formation would be desirable.

Attempts have been made to transfer an attractive and high quality holographic film to a tube laminate and subsequently print a pattern such as text or graphics onto the holographic film. However, the printing of patterns has met with limited success. It is difficult to obtain sufficient adhesion of an ink to the holographic film and insufficient adhesion results in peeling of the pattern from the tube during, for example, conventional industry product testing, such as a tape test.

BRIEF SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a laminate may include an inner polyolefin layer, an outer polyolefin layer, and a barrier layer interposed between the inner polyolefin layer and the outer polyolefin layer. The laminate may further include a holographic film attached to the outer polyolefin layer, the holographic film having a holographic grating layer, a reflective layer physically contacting the holographic grating layer, an adhesive layer formed on the holographic grating layer, and a release layer formed on the adhesive layer. The laminate may further include a primer coating layer on the release layer and a patterned layer on the primer coating layer.

Optionally, the laminate according to claim 1 further includes a varnish layer on the patterned layer.

Optionally, the holographic grating layer and the reflective layer are visible through the varnish layer, the primer coating layer, the release layer, and the adhesive layer, and may be visible through the patterned layer.

Optionally, the adhesive layer is a first adhesive layer, and the laminate further includes a second adhesive layer that attaches the outer polyolefin layer to the barrier layer and a third adhesive layer that attaches the inner polyolefin layer to the barrier layer.

Optionally, the laminate further includes a transfer adhesive that attaches the reflective layer to the outer polyolefin layer.

Optionally, the laminate further includes a seam having a first edge of the laminate and a second edge of the laminate, wherein the first edge overlaps, and is physically attached to, the second edge, and a crimp at a third edge of the laminate.

In another embodiment, a tube for storing a product may include a laminate. The laminate may include a first edge, a second edge opposite the first edge, a third edge, and a fourth edge opposite the third edge, an inner polyolefin layer, an outer polyolefin layer, a barrier layer interposed between the inner polyolefin layer and the outer polyolefin layer, and a holographic film attached to the outer polyolefin layer. The holographic film may include a holographic grating layer, a reflective layer physically contacting the holographic grating layer, an adhesive layer formed on the holographic grating layer, and a release layer formed on the adhesive layer. The laminate may further include a primer coating layer on the release layer, a patterned layer on the primer coating layer, a seam including the first edge of the laminate and the second edge of the laminate, wherein the first edge overlaps, and is physically attached to, the second edge, and a crimp at the third edge of the laminate. The tube may further include a tube shoulder attached to the fourth edge the laminate.

Optionally, the tube further includes a cap that attaches to the tube shoulder.

Optionally, the laminate further includes a varnish layer on the patterned layer.

Optionally, the holographic grating layer and the reflective layer are visible through the varnish layer, the primer coating layer, the release layer, and the adhesive layer, and may be visible through the patterned layer.

Optionally, the adhesive layer is a first adhesive layer, and the laminate further includes a second adhesive layer that attaches the outer polyolefin layer to the barrier layer and a third adhesive layer that attaches the inner polyolefin layer to the barrier layer.

Optionally, the tube further includes a transfer adhesive that attaches the reflective layer to the outer polyolefin layer.

In another embodiment, a method for forming a laminate may include attaching an inner polyolefin layer and an outer polyolefin layer to a barrier layer, wherein the barrier layer is interposed between the outer polyolefin layer and the inner polyolefin layer, providing a holographic film, wherein the holographic film includes a hologram having a holographic grating layer and a reflective layer that physically contacts the holographic grating layer, a release layer attached to the holographic grating layer, a backing layer, wherein the release layer attaches the backing layer to the holographic grating layer, and a protective coating over the reflective layer of the hologram. The method may further include forming a transfer adhesive on the outer polyolefin layer, attaching the protective coating to the outer polyolefin layer using the transfer adhesive, thereby attaching the holographic film to the outer polyolefin layer and, subsequent to attaching the holographic film to the outer polyolefin layer, separating the backing layer from the release layer.

Optionally, the method further includes priming the release layer and forming a patterned layer on the priming layer, wherein the patterned layer includes at least one of text and graphics.

Optionally, the priming of the release layer includes forming a primer coating layer on the release layer.

Optionally, the method further includes forming a varnish layer over the patterned layer, wherein the holographic grating layer and the reflective layer are visible through the varnish layer, the primer coating layer, and the release layer.

Optionally, the method further includes applying an adhesive layer to the release layer and attaching the holographic film to the release layer using the adhesive layer, wherein the holographic grating layer and the reflective layer are visible through the adhesive layer.

Optionally, the method further includes exposing the outer polyolefin layer to a corona discharge plasma to increase a surface tension of the outer polyolefin layer prior to forming of the transfer adhesive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

It should be noted that some details of the FIGS. have been simplified and are drawn to facilitate understanding of the present teachings rather than to maintain strict structural accuracy, detail, and scale.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls. As used herein, a "plastic" layer can include any suitable thermoplastic polymer that softens when heated to or above a melting temperature and solidifies when cooled to below the melting temperature. For example, a "plastic" layer can include, but is not limited to, a polyethylene, such as a high density polyethylene (HDPE), a low density polyethylene (LDPE), a linear low density polyethylene (LLDPE); a polypropylene such as a homo-propylene or co-propylene; a polyethylene terephthalate (PET); an ethylene vinyl alcohol (EVOH); a functional copolymer of ethylene, for example, in tie (i.e., adhesive) layers such as ethylene-acrylic acid copolymer (EAA), ethylene-methyl acrylate copolymer (EMA), etc. A "polyolefin" is a polymer produced from a simple olefin. A "polyolefin" may include, but is not necessarily limited to, one or more of the following: polypropylene (PP); polyethylene (PE); polymethylpentene (PMP); polybutene-1 (PB-1); polyolefin elastomers (POE) such as copolymer of ethylene and 1-butane, copolymer of ethylene and 1-hexene, copolymer of ethylene and 1-octene, etc., polyisobutylene (PIB), and ethylene propylene rubber (EPR).

The present teachings include the manufacture of a holographic tube, and a tube resulting from the manufacture, having acceptable adhesion of a printed patterned layer to a holographic film of the tube. A tube manufactured according to the present teachings may provide a tube with a holographic layer and a printed patterned layer that is sufficient to pass industry testing, for example, one or more tests that include a tape test, a tube soap immersion test, and/or a crush test, a printed tube product resistance test, a tube pinch-unzip test, a tube burst test, a tube leaking test, as well as others.

An exemplary method for forming a tube, such as a toothpaste tube, including polymer layers having a hologram that is visible from the exterior of the tube is depicted in FIGS. 1-10. It will be understood that a method and structure in accordance with the present teachings may include other elements that are not depicted or described herein for simplicity, while various elements that are depicted and/or described may be removed or modified.

Figure 1:
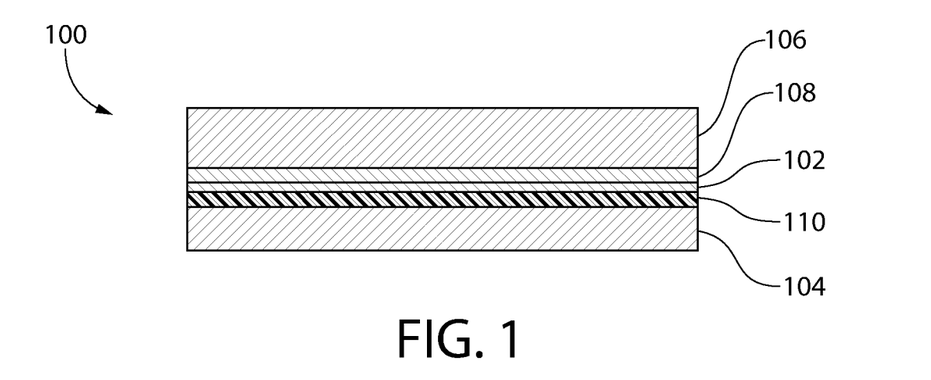
FIG. 1 is a cross section depicting an example of an in-process structure that may be formed according to the present teachings to create a laminate and a tube including the laminate.

FIG. 1 depicts a portion of a tube laminate 100 such as an aluminum barrier laminate (ABL) or a plastic barrier laminate (PBL). The tube laminate 100 may include a barrier layer 102 interposed between polymer layers 104, 106, such as between an inner polyolefin layer 104 and an outer polyolefin layer 106. The tube laminate 100 may include adhesive layers 108, 110 to adhere the barrier layer 102. The barrier layer 102 may include one or more of a metal layer such as an aluminum foil, a metal alloy, EVOH, nylon or other polyamide or polymer, etc., and combinations thereof. The barrier layer 102 may have a thickness of, for example, from about 7 micrometers ($\mu m$) to about 20 $\mu m$. The outer polyolefin layer 106 may have a thickness of from about 50 $\mu m$ to about 250 $\mu m$, and the inner polyolefin layer 104 may have a thickness of from about 25 $\mu m$ to about 75 $\mu m$. The adhesive layers 108, 110 may include a material such as EAA, and may each have a thickness of from about 10 $\mu m$ to about 30 $\mu m$. The tube laminate 100 thus includes a multilayer structure that provides a flavor barrier to prevent a decrease in the potency of the flavor of the product and/or a decrease in the number flavor molecules within the product as well as a gas barrier to prevent a gas, such as oxygen, from reaching a product stored within the completed tube, which may adversely affect the flavor and/or another characteristic of the product. The tube laminate 100 further provides a moisture barrier that seals the product within the completed tube. A tube laminate 100 such as that depicted in FIG. 1 may be manufactured by one of ordinary skill in the art.

Figure 2:
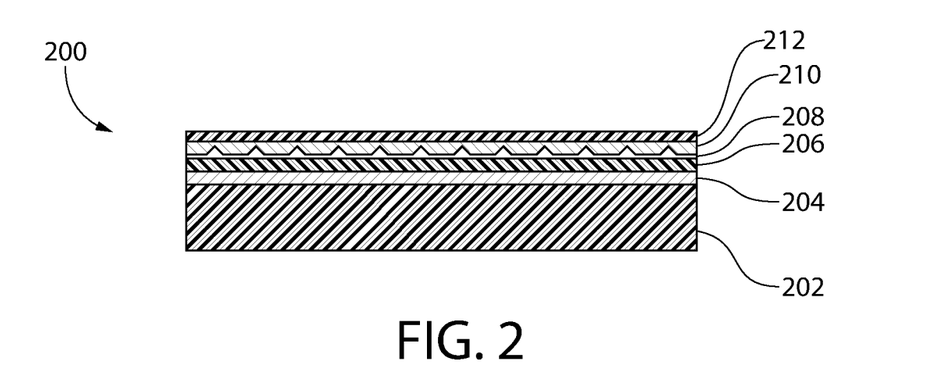
FIG. 2 is a cross section depicting a second example of an in-process structure that may be formed according to the present teachings to create a laminate and a tube including the laminate.

FIG. 2 depicts a holographic film 200 that may be transferrable to another structure such as the tube laminate 100 of FIG. 1. The holographic film 200 may be or include a cold foil transferrable holographic film having a structure that includes various layers, such as those depicted in FIG. 2. For purposes of description, a holographic film is a film that includes at least a holographic grating layer 208 and a reflective layer 210. The holographic film 200 may be or include a typical or off-the-shelf cold transfer holographic film that may be provided by a supplier. Typical cold transfer holographic films are available, for example, from Leonhard Kurz Stiftung & Co. KG of Fuerth, Germany.

The holographic film 200 of FIG. 2 may include a backing film 202 such as a polymer backing film 202. The backing film may be or include a polymer such as a polyester, for example, polyethylene terephthalate (PET).

FIG. 2 further depicts a release layer 204 attached to the backing film 202. The release layer 204 may be or include a material such as a silicone release coating from Dow Corning, or a custom-made adhesive in which one or more releasing agents, e.g., stearates, polymers with long side-chains, etc., are added to the regular adhesive to reduce its bonding strength to the back film.

The holographic film 200 of FIG. 2 may further include an adhesive layer 206 that attaches the release layer 204 to the holographic grating layer 208 having an embossed surface. The adhesive layer 206 may be or include an adhesive such as polyurethane.

The holographic grating layer 208 may be or include a UV-curable layer that has been applied onto layer 206. The hologram pattern may be pressed onto the adhesive layer 206 via an industry-standard embossing process, and then UV cured. The thickness of adhesive layer 206 may be from about 1 $\mu m$ to about 20 $\mu m$.

The reflective layer 210 is typically formed to physically contact the holographic grating layer 208. The reflective layer 210 may be a light-reflective layer that enhances the appearance of the holographic grating layer 208, and thus the completed tube. The reflective layer 210 may be, for example, a deposited metal layer having a high light reflectivity. The reflective layer 210 of the hologram may be formed using any known process. The reflective layer 210 may be formed as a conformal layer over the exposed surface of the holographic grating layer 208, or the reflective layer 210 may be formed as a flowable layer that fills in surface topography with a substantially planar upper surface that covers the holographic grating layer 208.

In some implementations of the present teachings, a protective coating 212 may be formed over and/or on the surface of the reflective layer 210 to prevent, for example, physical contact with the reflective layer during subsequent manufacture of the tube. The protective coating 212 may further be chemically inert relative to the reflective layer 210, thereby preventing chemical interaction with more chemically reactive materials the reflective layer 210 may come in contact with in the absence of the protective coating 212. The protective coating 212 may include, for example, a polymer such as one or more acrylics having a thickness of from about 10 $\mu m$ to about 50 $\mu m$.

After forming the tube laminate 100 and providing the holographic film 200, the holographic film 200 is transferred to the tube laminate 100 using, for example, a cold transfer process at ambient room temperature. The transfer may include exposing the exposed surface of the outer polyolefin layer 106 to a corona discharge plasma to provide a corona treatment that increases a surface tension of the outer polyolefin layer 106. For example, the outer surface of the outer polyolefin layer 106 may have a surface tension of about 32 dynes per centimeter (dyn/cm) or less prior to the corona treatment. Subsequent to corona treatment, the exposed surface of the outer polyolefin layer 106 may have a surface tension of about 42 dyn/cm or greater. In one example, the corona treatment may include exposing the outer polyolefin layer 106 to a corona discharge plasma having a power or intensity of from about 1.5 watts per minute per square foot (watt/min/ft$^2$) and about 2.6 watt/min/ft$^2$ for a duration of from about 0.4 seconds to about 2 seconds. This corona treatment is exemplary, and other corona treatments having other intensities for other durations that increase the surface tension of the outer polyolefin layer 106 to about 42 dyn/cm or greater are contemplated.

Figure 3:
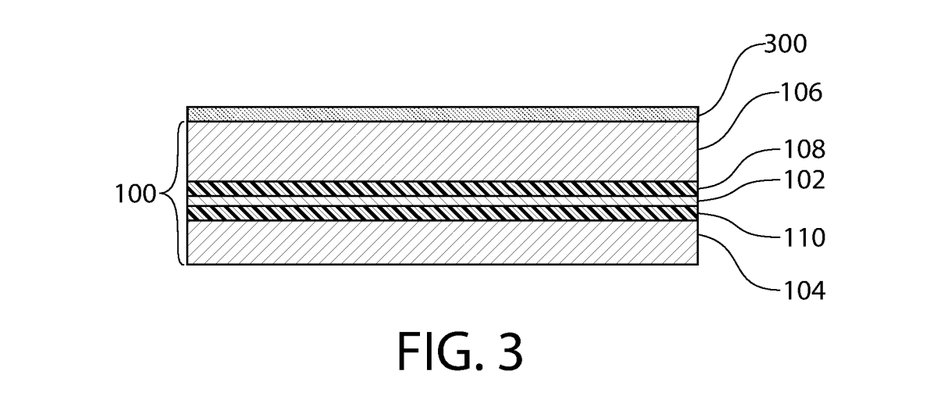
FIG. 3 is a cross section depicting a third example of an in-process structure that may be formed according to the present teachings to create a laminate and a tube including the laminate.

Next, a transfer adhesive 300 is applied to the corona-treated outer polyolefin layer 106 as depicted in FIG. 3. The transfer adhesive 300 may be, for example, a UV-curable adhesive or another suitable adhesive. Various UV-curable and other transfer adhesives are contemplated, including, but not limited to: Foilbond™ TC UVH 00007 and TC UVH 00008 available from Flint Group of Charlotte, N.C.; UVA-FLEX UV adhesive U0842 available from Zeller+Gmelin of Eislingen, Germany; and NewV flex cold foil adhesive 67UF0004 available from Stehlin & Hostag AG of Lachen, Germany.

Figure 4:
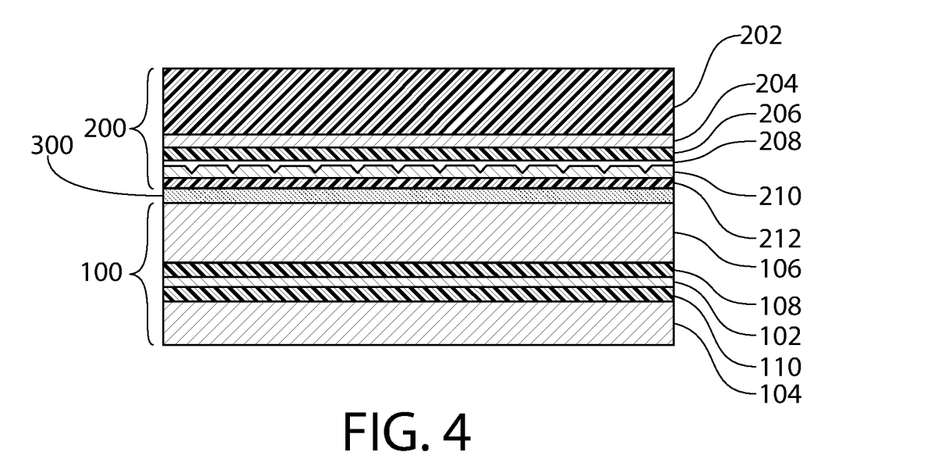
FIG. 4 is a cross section depicting a fourth example of an in-process structure that may be formed according to the present teachings to create a laminate and a tube including the laminate.

Subsequently, to complete the transfer of the holographic film 200 onto the tube laminate, the protective coating 212 is placed onto the transfer adhesive 300, then the transfer adhesive 300 is cured using, for example, exposure to a suitable wavelength of UV light to result in the structure of FIG. 4. The transfer adhesive 300 thus physically secures and bonds the holographic film 200 to the tube laminate 100.

Figure 5:
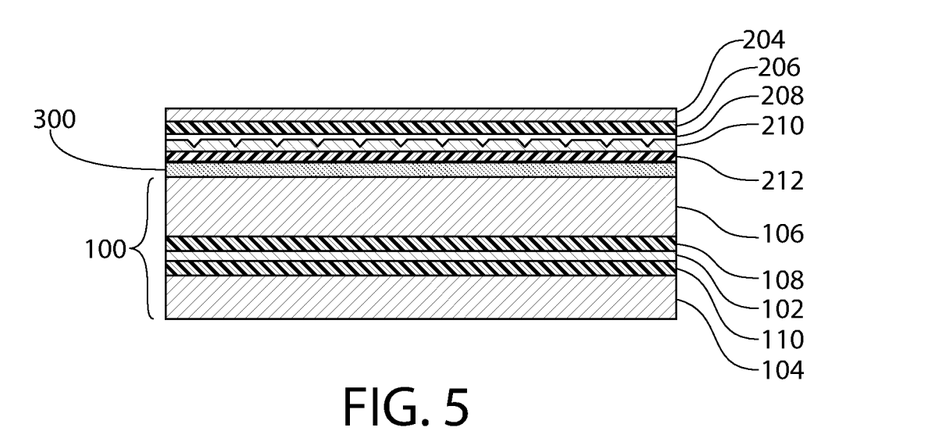
FIG. 5 is a cross section depicting a fifth example of an in-process structure that may be formed according to the present teachings to create a laminate and a tube including the laminate.

Next, after transferring the holographic film 200 to the tube laminate 100, the backing film 202 is peeled or otherwise removed from the release layer 204, leaving the structure as depicted in FIG. 5 and exposing the release layer 204 to air.

Figure 6:
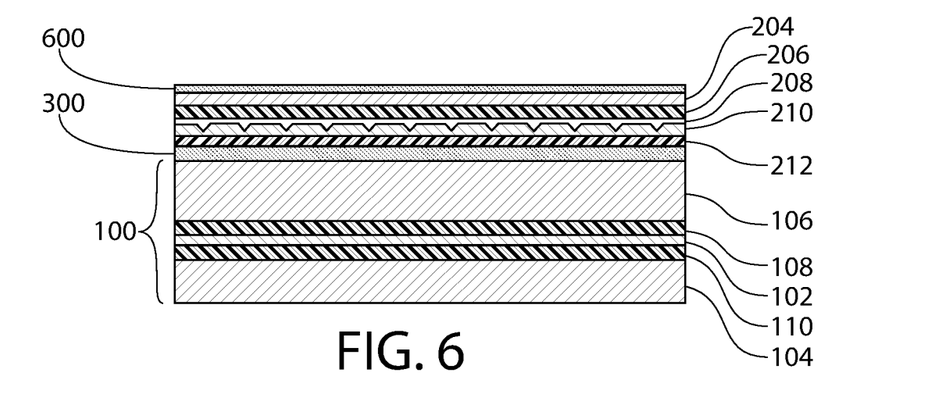
FIG. 6 is a cross section depicting a sixth example of an in-process structure that may be formed according to the present teachings to create a laminate and a tube including the laminate.

To improve the adhesion of a subsequent printed pattern, the exposed upper surface of the FIG. 5 structure may be primed. The upper exposed surface of the FIG. 5 structure may be primed by applying a primer (i.e., a priming layer, adhesion promotor, or primer coating layer) such as a primer coating layer 600 as depicted in FIG. 6. The primer may include a UV-curable primer such as product number HCC00108 available from Flint Group, IDS-PR-602 adhesion promotor available from Innovative Digital Systems of Indian Trail, N.C., or SolarClear available from Sun Chemical of Parsippany-Troy Hills, N.J. The primer layer 600 may cover the entire release layer 204. The primer layer 600 may be a clear or transparent coating, or a semi-transparent coating.

The primer coating layer may have a thickness of from about 0.5 µm to about 15.0 µm, or from about 1.0 µm to about 8.0 µm, or from about 2.0 µm to about 5.0 µm. This primer coating layer 600 may be applied to fully cover the release layer 204 in its entirety to provide an improved surface for over printing of a subsequent printed layer such as a printed patterned layer. After application, the primer coating layer 600 may be cured using a suitable curing process, such as by exposing the primer coating layer 600 to UV light.

Figure 7:
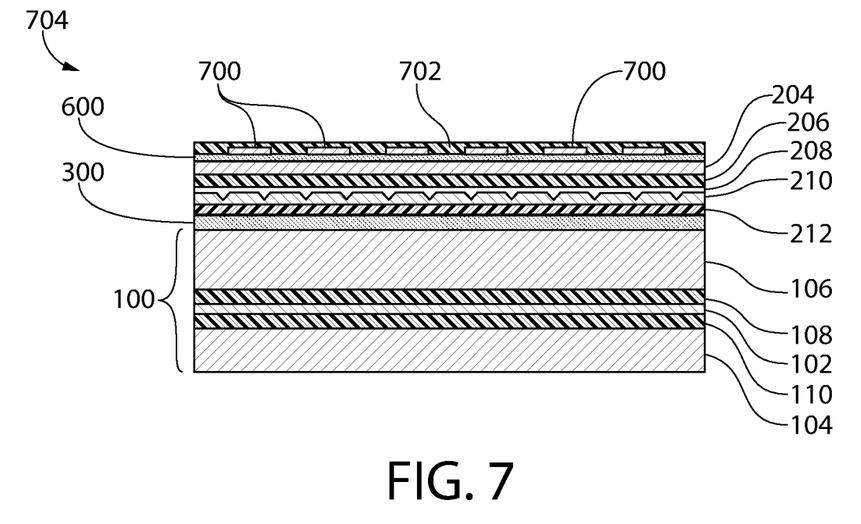
FIG. 7 is a cross section depicting a seventh example of an in-process structure that may be formed according to the present teachings to create a laminate and a tube including the laminate.

Next, a patterned layer 700 including text, graphics, and other artwork or product information may be printed or transferred onto the upper surface of the FIG. 6 structure (e.g., on the top of the primer coating layer 600), as depicted in FIG. 7. The patterned layer may include a printed or silkscreened pigmented liquid layer that is subsequently cured, a colored plastic or polymer layer that is transferred to the upper surface, etc. The patterned layer may be, for example, translucent such that the holographic grating layer and the reflective layer are visible through the patterned layer, or the patterned layer may be opaque. The primer layer 600 may function as an adhesion layer to bond the patterned layer 700 to the release layer 204.

The transfer of the holographic film 200 onto the tube laminate 100, the removal of the backing film 202 from the release layer 204, the formation of the primer layer 600 over the release layer 204, and the formation of the patterned layer 700 on the primer layer 600 may be performed at a single workstation such as a press. In one exemplary aspect of the present teachings, these processing acts may be carried out consecutively at a printing station of, for example, a Lombardi INVICTA press. In an alternative, the method may be performed at two or more different workstations. Performing several processing stages at a single workstation may minimize processing time and therefore reduce processing costs.

Next, a varnish layer 702 may be applied over the patterned layer 700 to provide a top sealer coating to further protect the patterned layer 700 and to provide a completed laminate (e.g., a laminate sheet) 704 that may be used as described below to form a tube or other packaging structure. The varnish layer 702 may help prevent wear and damage to the patterned layer 700 during use of the product by the user and reduce lifting of the patterned layer 700 off the primer layer 600. In various embodiments, the varnish layer 702 may be clear, transparent, or semi-transparent. In addition, the material that forms the varnish layer 702 may be selected to provide a coefficient of friction of the laminate 704 that is, for example, 0.2 or greater. A coefficient of friction of 0.2 or greater may provide a laminate 704 that is particularly suitable for the tube making process described below. In an example, the varnish layer 702 may be formed from a material such as epoxy acrylates, urethane acrylates, polyester acrylates and combinations of two or more of these.

In various implementations, the application of the varnish layer may be carried out consecutively and subsequently to the transferring of the holographic film 200 onto the tube laminate 100, the removal of the backing film 202 from the release layer 204, the formation of the primer layer 600 over the release layer 204, and the formation of the patterned layer 700 on the primer layer 600 at a single workstation such as a press, for example, the Lombardi INVICTA press. In an alternative, the method may be performed at two or more different workstations.

Figure 8:
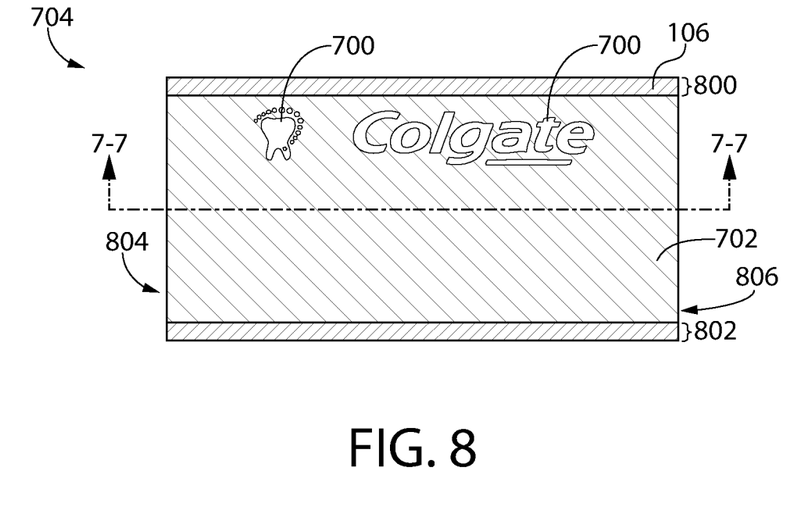
FIG. 8 is a plan view of the FIG. 7 structure.

FIG. 8 is a plan view of the FIG. 7 structure, where FIG. 7 is a cross section along 7-7 of FIG. 8. The laminate 704 may include a first edge 800 and a second edge 802 along which the holographic film 200 is not attached to or formed. Along the edges 800, 802, the tube laminate 100 and, more specifically, the outer polyolefin layer 106 of the tube laminate 100, is exposed. This provides edges 800, 802 with exposed polyolefin to facilitate tube making as described below. FIG. 8 also depicts a patterned layer 700 that includes text and graphics, where the printed layer 700 is visible under the varnish layer 702. The laminate 704 may also include a third edge 804 and a fourth edge 806.

Figure 11:
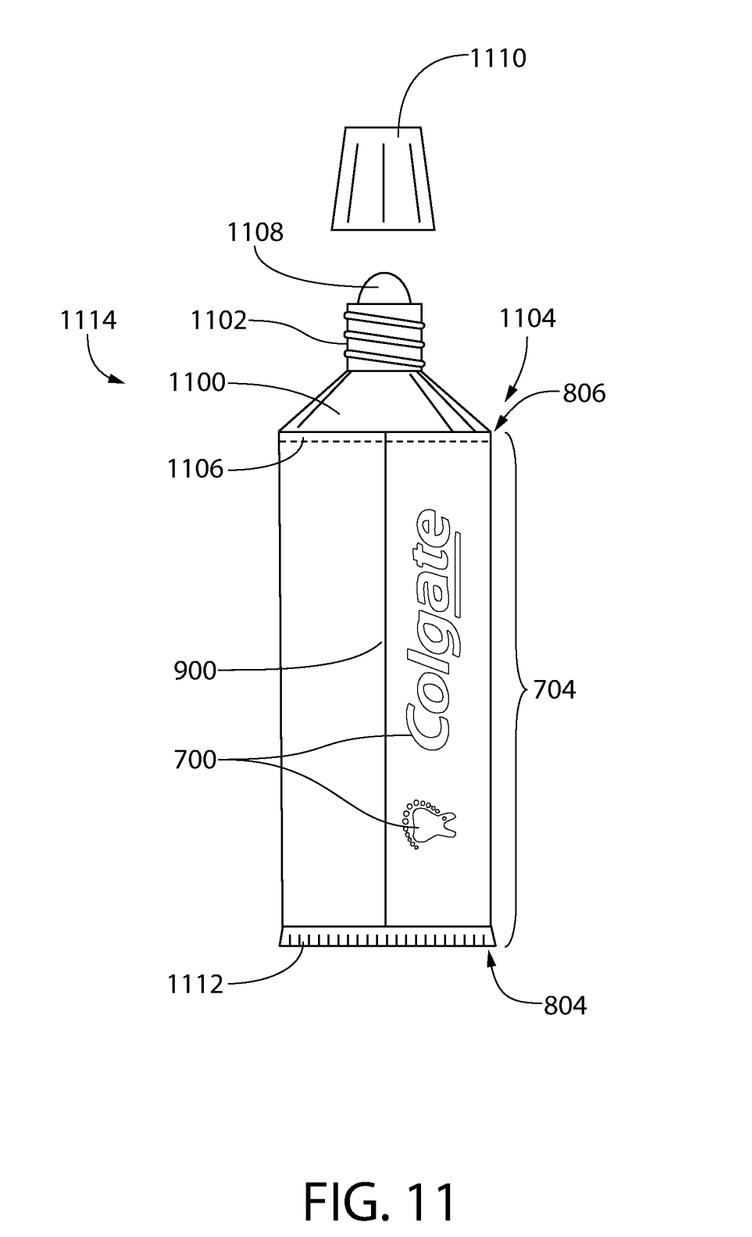
FIG. 11 is a side view of a tube and a product within the tube according to one aspect of the present teachings.

After forming the laminate 704 of FIG. 8, the laminate 704 may be formed or assembled into a tube, such as the tube 1114 of FIG. 11. In one exemplary aspect for forming the tube 1114, the laminate 704 may be rolled and overlapped into a cylinder as depicted in the cross section of FIG. 9, such that the first edge 800 of the laminate 704 overlaps the second edge 802 of the laminate 704. Because the exposed edges 800, 802 are not covered by the holographic film 200, the inner polyolefin layer 104 physically contacts the outer polyolefin layer 106 at the overlapping side seam 900 during this process. In various embodiments, the edge 800 may be physically attached to the edge 802 using any means or techniques known in the art.

Figure 9:
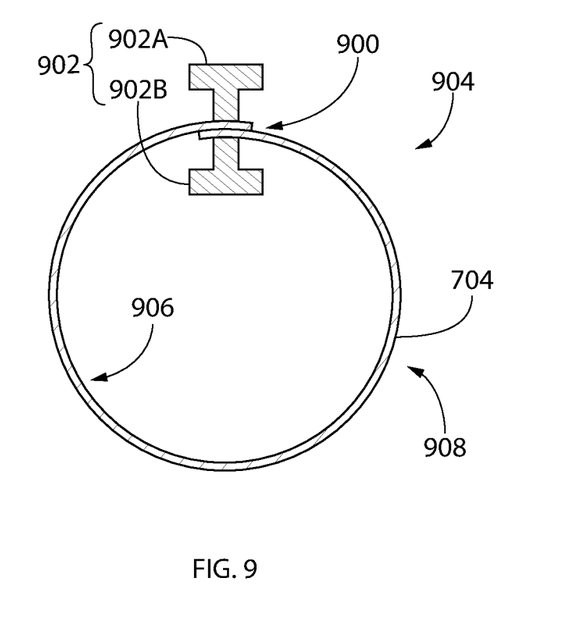
FIG. 9 is a cross section depicting an example of sealing of a seam during formation of a tube from the laminate sheet.

In one particular aspect of the present teachings, the edge 800 may be physically attached to the edge 802 by forming a self-sealing side seam 900 without using additional adhesive as depicted in FIG. 9, in which the first edge 800 is overlapped with the second edge 802, then positioned and held under pressure by a clamp 902. The first edge 800 and the second edge 802 are heated. A clamping pressure exerted by an outer clamp portion 902A and an inner clamp portion 902B onto the overlapped side seam 900 may be from about 0.1 bar to about 2.0 bars, which is sufficient to maintain physical contact and pressure between the surfaces of the inner polyolefin layer 104 and the outer polyolefin layer 106 to facilitate a suitable seal, but insufficient to deform and thin the heated and softened materials.

In various implementations, the clamp 902 may be heated which, in turn, heats the portion of the laminate 704 that is positioned within the clamp 902, and more particularly the outer polyolefin layer 106 and the inner polyolefin layer 104. The heating and softening of layers 104, 106 is localized in the region of contact between the first edge 800 and the second edge 802 of the laminate 704 and the clamp 902, and the clamp 902 heats and softens the outer polyolefin layer 106 and the inner polyolefin layer 104 only in proximity to the overlap.

The outer clamp portion 902A may be heated to a different temperature than the inner clamp portion 902B, or to the same temperature. For example, the outer clamp portion 902A may be heated to a first temperature of from about 200° C. to about 220° C., for example about 210° C., and the inner clamp portion 902B may be heated to a second temperature of from about 115° C. to about 135° C., for example about 125° C.

Figure 10:
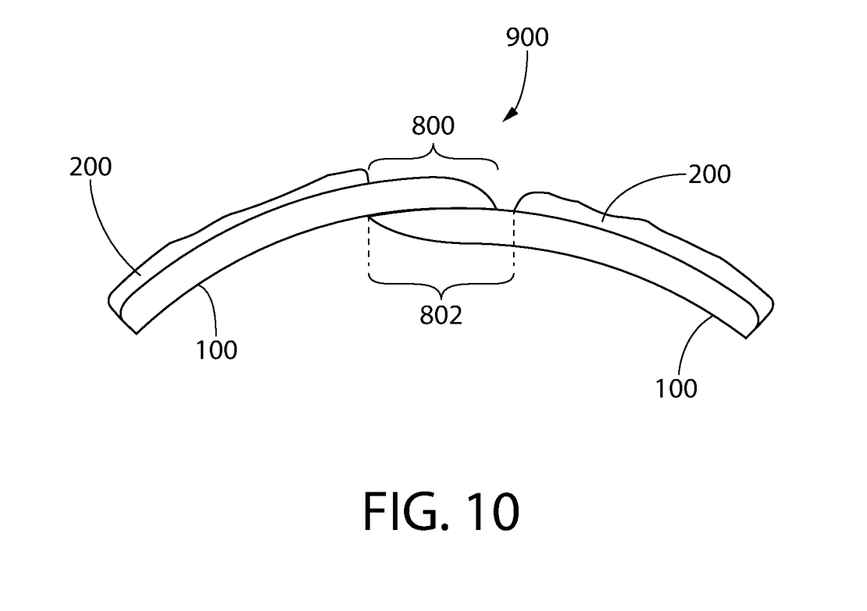
FIG. 10 is a magnified view of a portion of the seam of FIG. 9.

The layers 104, 106 may be heated by the clamp 902 to a temperature of from about 100° C. to about 250° C., or to a temperature sufficient to soften, melt, and flow the layers 104, 106 without excessively decreasing their viscosity. The heating and pressure from the clamp 902 causes the outer polyolefin layer 106 and the inner polyolefin layer 104 to soften and flow together to seal the edges 800, 802 of the complete laminate 704 as depicted in the simplified magnified cross section of FIG. 10. After heating the edges 800, 802 of the tube laminate 100 and the laminate 704, the layers are cooled to form a completed, self-sealing side seam 900. In the FIG. 9 structure, the laminate 704 forms a cylindrical tube body 904 having an inner wall 906 that may be provided by the inner polyolefin layer 104 and an outer wall 908 provided by the varnish layer 702. For simplicity, the magnified view of FIG. 10 depicts the tube laminate 100 as a single layer, and further depicts the holographic film 200 as a single layer.

Subsequently, as depicted in FIG. 11, a tube shoulder 1100 that may include an exit nozzle 1102, such as a threaded exit nozzle, can be attached to an open end 1104 at the fourth edge 806 of the cylindrical tube body 904. The tube shoulder 1100 may include an internal ridge (i.e., flange) 1106 that fits within the open end 1104 of the cylindrical tube body 904. The tube shoulder 1100 may be heat sealed to the cylindrical tube body 904 to attach the tube shoulder 1100 to the cylindrical tube body 904.

After attachment of the tube shoulder 1100, a cap 1110, for example a threaded cap, may be attached to the exit nozzle 1102. It will be appreciated that other non-threaded cap and exit nozzle designs are contemplated, such as a hinged flip cap that snaps onto the exit nozzle under the application of pressure by a user. After attachment of the cap 1110, the cylindrical tube body 904 may be filled with the product 1108 through the open end of the cylindrical tube body (at the third edge 804 at a lower end of the cylindrical tube body 904 in the FIG. 11 orientation). The product 1108 may include, for example, a toothpaste, a food item, a lotion, etc.

After placement of the product 1108 within the cylindrical tube body 904, the open end of the cylindrical tube body 904 can be crimped such that a first section of the inner polyolefin layer 104 physically contacts a second section of the inner polyolefin layer 104 at the inner wall 906 (FIG. 9) of the cylindrical tube body 904. The inner polyolefin layer 104 may be heated and softened to form a self-sealing end seal 1112 and a completed tube 1114 as depicted in the side view of FIG. 11. Thus the laminate 704 forms a completed tube body of FIG. 11. Any deformation of the holographic film 200 from the application of heat may be localized to the area of the crimp 1112 and thus any loss in the holographic effect is also localized to the relatively small region of the crimp 1112. In another exemplary aspect, the holographic film 200 may be formed such that it does not extend to the third edge 804 of the laminate 704 to provide a region at the third edge 804 of the laminate 704 that is similar to the edges 800, 802 as depicted in FIG. 8, and thus the holographic film 200 is not heated during formation of the crimp 1112. During use, a user may dispense the product 1108 from an opening in the exit nozzle 1102 of the tube shoulder 1100.

Thus the present teachings can include a tube and method for forming the tube. The completed tube can include a polymer tube laminate and a holographic film attached to the polymer tube laminate. The holographic film may include a hologram provided by at least a holographic grating layer and a reflective layer that are visible from an exterior of the tube. The holographic grating layer and the reflective layers may be visible through other layers, such as a varnish layer, a primer layer, a release layer, and an adhesive layer. The holographic film may be preassembled with a release layer and a backing layer that protects the release layer. The backing layer may be peeled from the release layer, then an adhesive layer may be formed to physically attach the holographic film to the tube laminate. A patterned layer that may include text and/or graphics may be printed onto the holographic film.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A laminate, comprising:
an inner polyolefin layer;
an outer polyolefin layer;
a barrier layer interposed between the inner polyolefin layer and the outer polyolefin layer;
a holographic film attached to the outer polyolefin layer, comprising:
a holographic grating layer;
a reflective layer physically contacting the holographic grating layer;
an adhesive layer formed on the holographic grating layer; and
a release layer formed on the adhesive layer;
a primer coating layer on the release layer; and
a patterned layer on the primer coating layer.

2. The laminate according to claim 1, wherein the adhesive layer is a first adhesive layer, and the laminate further comprises:
a second adhesive layer that attaches the outer polyolefin layer to the barrier layer; and
a third adhesive layer that attaches the inner polyolefin layer to the barrier layer.

3. The laminate according to claim 1, further comprising a transfer adhesive that attaches the reflective layer to the outer polyolefin layer.

4. The laminate according to claim 1, further comprising:
a seam comprising a first edge of the laminate and a second edge of the laminate, wherein the first edge overlaps, and is physically attached to, the second edge; and
a crimp at a third edge of the laminate.

5. The laminate according to claim 1, further comprising a varnish layer on the patterned layer.

6. The laminate according to claim 5, wherein the holographic grating layer and the reflective layer are visible through the varnish layer, the primer coating layer, the release layer, and the adhesive layer.

7. A tube for storing a product, the tube comprising:
a laminate, comprising:
a first edge, a second edge opposite the first edge, a third edge, and a fourth edge opposite the third edge;
an inner polyolefin layer;
an outer polyolefin layer;
a barrier layer interposed between the inner polyolefin layer and the outer polyolefin layer;
a holographic film attached o the outer polyolefin layer, comprising:
a holographic grating layer;
a reflective layer physically contacting the holographic grating layer;
an adhesive layer formed on the holographic grating layer; and
a release layer formed on the adhesive layer;
a primer coating layer on the release layer;
a patterned layer on the primer coating layer;
a seam comprising the first edge of the laminate and the second edge of the laminate, wherein the first edge overlaps, and is physically attached to, the second edge; and
a crimp at the third edge of the laminate; and
a tube shoulder attached to the fourth edge the laminate.

8. The tube according to claim 7, further comprising a cap that attaches to the tube shoulder.

9. The tube according to claim 7, wherein the adhesive layer is a first adhesive layer, and the laminate further comprises:
a second adhesive layer that attaches the outer polyolefin layer to the barrier layer; and
a third adhesive layer that attaches the inner polyolefin layer to the barrier layer.

10. The tube according to claim 7, further comprising a transfer adhesive that attaches the reflective layer to the outer polyolefin layer.

11. The tube according to claim 7, wherein the laminate further comprises a varnish layer on the patterned layer.

12. The tube according to claim 11, wherein the holographic grating layer and the reflective layer are visible through the varnish layer, the primer coating layer, the release layer, and the adhesive layer.

13. A method for forming a laminate, comprising:
attaching an inner polyolefin layer and an outer polyolefin layer to a barrier layer, wherein the barrier layer is interposed between the outer polyolefin layer and the inner polyolefin layer;
providing a holographic film, wherein the holographic film comprises:
a hologram comprising a holographic grating layer and a reflective layer that physically contacts the holographic grating layer;
a release layer attached to the holographic grating layer;
a backing layer, wherein the release layer attaches the backing layer to the holographic grating layer; and
a protective coating over the reflective layer of the hologram;
forming a transfer adhesive on the outer polyolefin layer;
attaching the protective coating to the outer polyolefin layer using the transfer adhesive, thereby attaching the holographic film to the outer polyolefin layer; and
subsequent to attaching the holographic film to the outer polyolefin layer, separating the backing layer from the release layer.

14. The method according to claim 13, further comprising:

applying an adhesive layer to the release layer; and attaching the holographic film to the release layer using the adhesive layer, wherein the holographic grating layer and the reflective layer are visible through the adhesive layer.

15. The method according to any of claim 13, further comprising exposing the outer polyolefin layer to a corona discharge plasma to increase a surface tension of the outer polyolefin layer prior to forming of the transfer adhesive.

16. The method according to claim 13, further comprising:

priming the release layer; and forming a patterned layer on the priming layer, wherein the patterned layer comprises at least one of text and graphics.

17. The method according to claim 16, wherein the priming of the release layer comprises forming a primer coating layer on the release layer.

18. The method according to claim 17, further comprising forming a varnish layer over the patterned layer, wherein the holographic grating layer and the reflective layer are visible through the varnish layer, the primer coating layer, and the release layer.

\* \* \* \* \*